Oct. 3, 1950 — W. L. HAID — 2,524,125
MEASURING TRAP HAVING AN AIR SEAL CUTOFF
Filed Oct. 9, 1948
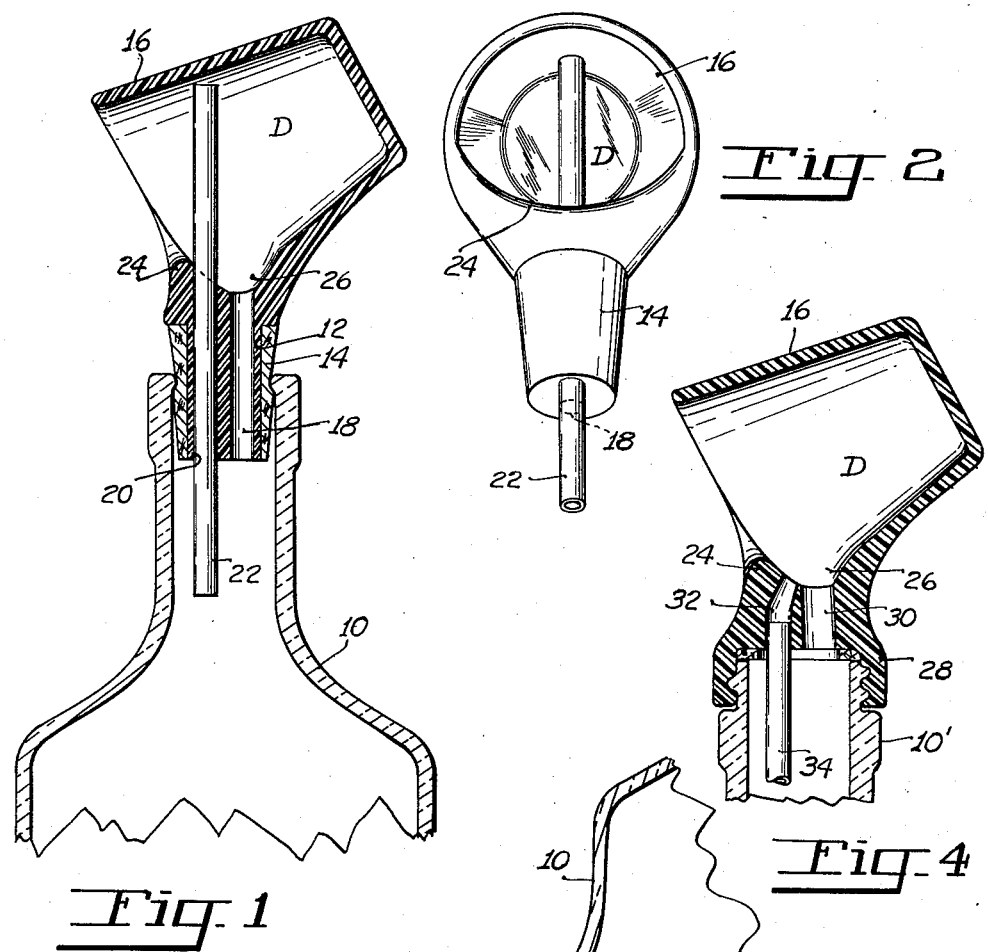
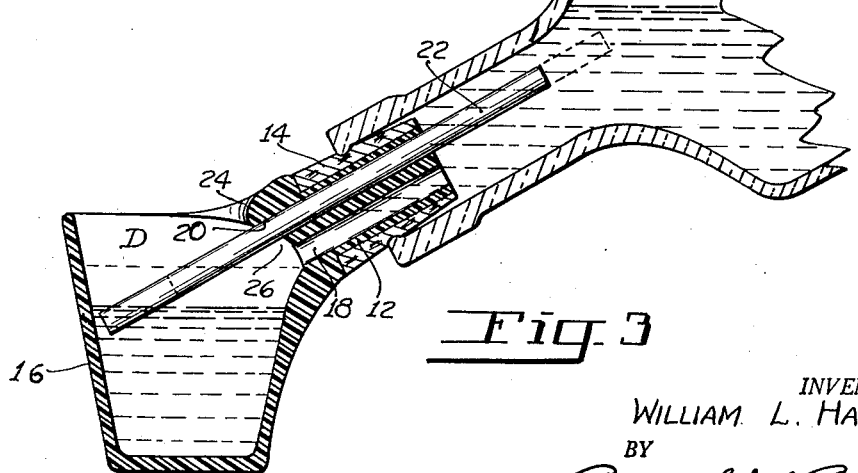
INVENTOR.
WILLIAM L. HAID
BY
Reynolds & Beach
ATTORNEYS Patented Oct. 3, 1950

2,524,125

UNITED STATES PATENT OFFICE 2,524,125

MEASURING TRAP HAVING AN AIR SEAL CUTOFF

William L. Haid, Seattle, Wash.

Application October 9, 1948, Serial No. 53,721

6 Claims. (Cl. 222—109)

This invention pertains to liquid dispensing devices, and more particularly to those of the measuring type primarily adapted for attachment to the mouth of a bottle or other liquid container to limit the amount of liquid issuing from the bottle each time it is tilted. Such dispensers are very handy for measuring quantities of liquor in mixing drinks, and otherwise.

Most of the measuring dispensers heretofore proposed have been rather expensive because of their complexity. These were of the type which functioned effectively merely as volume limiting or automatic cut-off valves interposed over the mouth of the bottle issuing the liquid. In each of these, the measure of liquid was poured directly into the ultimate receptacle. Most incorporated angulated or multifarious interior surfaces not easily reached for cleaning purposes and hence were very objectionable on that account.

For these and other reasons many individuals have preferred an entirely different type of measuring dispenser, namely one embodying an open-mouthed receptacle with means for attaching the same to the mouth of a bottle to receive the measure of liquid as a preliminary step in the dispensing operation before such receptacle is emptied into a glass or other ultimate receiver. In order to fill the open-mouthed receptacle by tilting the bottle, a spout passage is provided in the attaching means, extending between an opening in the side wall of the receptacle and the interior of the bottle. Also, an air-intake or breather tube draws air from within the receptacle into the bottle to displace liquid poured therefrom. When the liquid in the receptacle rises to submerge the entrance of the breather tube, which occurs at a liquid level corresponding to the measure of liquid to be poured, such air flow is cut off, terminating flow of liquid out of the bottle. The open-mouthed receptacle containing a predetermined measure of liquid may then be emptied directly into a glass or other receiver, and the bottle carrying the receptacle returned to standing position ready for future use.

While measuring dispensers of the open-mouthed type heretofore available have definite advantages over other types, there has been considerable dissatisfaction with them because of the dripping of residue liquid out of the upturned receptacle when the bottle carrying it was returned to standing position. Sometimes as much as a dram or more would be wasted in this manner out of every bottle of liquor or other liquid, not to mention the messy condition of the bottle and frequently the ruining of furniture surfaces on which the bottle was placed. For this problem the only solution heretofore advanced was to wipe out the receptacle after each pouring, which was inconvenient and did not eliminate waste.

The primary object of the present invention is to devise an improved liquid dispensing device generally of the described open-mouthed variety, which prevents this waste and messiness by catching and recovering the residue liquid in the receptacle. The same is accomplished without unduly complicating the receptacle to increase its cost, detract from its appearance or make it more difficult to clean because of hidden or interior surfaces and awkward corners. The essential improvement resides primarily in the provision of an inwardly projecting lip or bead extending part way around the rim of the receptacle to catch any remaining drops of liquid tending to flow back out of the receptacle when the same is inverted as the bottle is placed in standing position. This, or an equivalent, cup construction is an exceedingly simple though highly effective solution to the difficulties mentioned.

Preferably the inner, lower side of this lip is inclined towards and fairs into the adjoining receptacle wall at the edge of the spout opening therein, so that cleaning is made easy and liquid caught is directed to flow back into such opening and hence into the bottle where it will not evaporate as it might if left in the receptacle though caught by the lip. The lip, extending only part way around the rim of the receptacle, is preferably centered with relation to the spout opening, is thickest or widest at that location and is tapered toward its ends, so that liquid may be poured from either side of the receptacle into a glass or other receiver without interference from the lip.

A further object of the invention is to devise an improved liquid dispensing device of the open-mouthed type having the further feature of adjustable liquid measuring control. The same is accomplished by an air-displacement or breather tube communicating between the measuring receptacle and the supporting bottle, which tube is supported for lengthwise adjustment to vary the location of its open end in the receptacle above the bottom thereof, and thereby control the flow cut-off level of liquid in the receptacle.

These and other features, objects and advantages of the invention will become further apparent from the following description based upon the accompanying drawings which illustrate a preferred form of the invention.

Figure 1 is a vertical section of my improved liquid dispenser attached to a bottle shown in standing position and the lower portion of which is broken away.

Figure 2 is a front view of the dispenser in the same position.

Figure 3 is a vertical section corresponding to Figure 1, showing the bottle tilted to fill the dispenser receptacle.

Figure 4 is a vertical section of a modified form of liquid dispenser embodying a feature of the invention.

While my improved measuring dispenser is readily adapted for attachment to a number of different types of containers it is herein illustratively shown as mounted at the mouth of a narrow necked bottle 10 (Fig. 1) of the type commonly used to contain liquors or soft drink extracts. To this end the illustrated dispenser D has a mounting comprising a stem or plug portion 12 encircled by a tapered sealing collar 14 of a soft material such as cork or rubber. The covered stem portion may be inserted and pressed tightly into the open mouth of the bottle, as shown in Figure 1, to form a liquid seal connection to the bottle.

The stem 12 branches laterally from and supports the open mouthed dispenser receptacle 16 which is preferably formed as a cylindrical cup the wall of which tapers moderately from rim to bottom. The central axis of the stem, generally coincident with that of the bottle, forms an acute angle with the central axis of the cup 16 substantially perpendicular to the plane of the cup's mouth or rim, so that when the bottle is standing the open cup is tilted downward at an acute angle in the vicinity of 30 degrees or thereabouts. The precise angular relationship is not critical, although the angle mentioned is one which facilitates pouring easily from the bottle into the receptacle 16 and then from the latter into a glass or other receiver by tilting the bottle.

The stem portion 12 joins the cup 16 near the latter's rim or mouth and has a through-bore 18 communicating between the interior of the supporting bottle 10 and the upper inside portion of the cup. The bore 18 constitutes a pouring spout through which the cup may be filled by gravity flow when the bottle is tilted as shown in Figure 3.

Generally parallel to the bore 18, and between the same and the rim end of the cup 16, a second bore 20 extends through the stem portion 12. In communication with the bottle and cup interiors, a breather tube 22 extends slideably through this latter bore. Through this tube air is drawn from within the cup into the inclined bottle to displace liquid flowing from the latter into the cup through spout bore 18. When the level of liquid in the cup rises to submerge the cup end of the tube such air flow is cut off, forming a lock and preventing further flow of liquid into the cup. The measure of liquid received by the cup is thereby accurately determined, and the cup may then be emptied into a glass, for example, merely by tilting the cup sideways as by a general rotational movement of the bottle in either sense about its central axis, as with prior similar devices.

A feature of the invention resides in the provision of the breather tube 22 slideably mounted in the stem portion and of such a length that the cup end of such tube may be adjustably positioned over a range substantially from the cup end of bore 20 to the opposite wall of the cup. Because the tube 22 is inclined relative to the central axis of the cup and toward the cup's bottom such adjustment of the tube 22 appreciably varies the distance between the air-intake or cup end of the tube and the cup's bottom. Accordingly, by this means the measure of liquid received by the cup each time the bottle is tilted for pouring is readily and accurately adjustably controlled.

The effect is shown in Figure 3, wherein the maximum level of liquid in the cup is limited at the dot-dash line position with the tube 22 extended as shown by corresponding solid lines, and alternatively at a different, higher position represented by dotted lines. A variation in measure by as much as two-to-one, or more, may readily be obtained in this manner with the particular form of dispenser illustrated. The tube 22 is completely removable for cleaning or replacement.

An important feature of the invention further resides in the provision of means to prevent residue liquid dripping out of the upturned cup when the bottle is righted as shown in Figure 1 after the dispenser has been used. Such a means comprises the inwardly projecting lip or bead formation 24 on or between the rim of the cup and the spout opening 18 at the stem side of the cup. Preferably this lip extends only part way around the cup, tapers from a maximum inwardly projecting width at its mid-portion to its opposite ends which merge gradually into the rim walls. The lip is formed symmetrically in relation to the cup about a central longitudinal plane containing the cup's axis and bores 18 and 20. The inner, lower wall of the lip 24 facing the cup's bottom is sloped downward and inward from the edge of the lip to the edge of the spout opening 18 and preferably fairs into the side wall of the cup. Thus any remaining drops of liquid formed in the cup and running down its sides tending to flow out are caught by the lip 24 and caused to flow along the base of the lip into the opening 18, returning to the bottle. In this manner, for example, substantial quantities of liquor may be saved and a great deal of the usual messiness of liquor running back over the bottle prevented. The cup is easily cleaned inside and out.

Moreover, the antidrip lip 24 does not interfere with pouring from the receptacle 16 since it extends only a fraction of the way, such as 180 degrees or less, around its rim and is at a circumferential location thereon at which such pouring would not ordinarily be done in any event. With the lip 24 symmetrically formed and located on the cup, pouring from either side of the cup, as by left-handed or right-handed persons, would be done in precisely the same convenient manner.

While the precise inwardly projecting maximum width of the rim 24 is more or less optional it is preferably made as small as possible consistent with functioning for its described purposes. Thus, as illustrated, the lip can be formed merely as a narrow bead of a width at its midpoint of perhaps one-fourth or less of the diameter of the cup at its mouth. By limiting the width of the bead to a small fraction of the cup's diameter the cup's mouth is virtually unrestricted for pouring, for cleaning purposes and for appearance's sake, yet the bead catches any liquid remaining in the cup and returns it back into the bottle as well as it would if the lip were much wider.

If desired, and as illustrated, the wall of the cup at the base of the lip 24 and immediately surrounding the spout opening 18 may be recessed or depressed to form a catch basin 26. Such a formation has a funnel effect, directing the residue more certainly and completely back into spout opening 18.

It will therefore be evident that my improved liquid dispenser incorporates the two cooperating features described, namely the means to adjust a measured quantity of liquid receivable by the bottle-attached cup, and the cooperating lip or bead located between the spout opening and the cup's rim to catch residue after pouring from the cup and returns the same to the bottle. Any drops of liquid running down the exterior of tube 22 are likewise caught by lip 24 since the tube enters bore 20 inside the lip's edge.

In Figure 4 I have illustrated a modified form of my bottle-attached liquid measuring dispenser. In this case the mounting 28 is of the screw-on cap type adapted to engage a bottle the end of which is threaded to receive a cap instead of adapted to receive a cork or plug. In this case the spout bore 30 may be shorter than previously, although the functioning of the device is unaltered in any respect. A breather opening 32 is provided in the wall of the cup 16 which communicates through tube 34 with the interior of the bottle 10', although in this instance the feature of an adjustable breather tube is omitted from the illustration, the quantity of liquid dispensed at each pouring remaining constant.

I claim as my invention:

1. A liquid dispensing device comprising an open-mouthed generally cylindrical measuring receptacle, means for mounting said receptacle on the mouth of a liquid container at an angle thereto such that the receptacle is upright when the container is tilted for pouring but opens at an incline downward with the container in standing position, said receptacle having an opening in its side wall adjacent to said container mouth, to communicate between said container and said receptacle for pouring a measure of liquid into said receptacle by tilting of said container, and an inwardly projecting means on said side of the receptacle, located between its rim and said opening, to catch drops of liquid tending to drip back out of said receptacle when said container is placed in standing position after pouring.

2. A liquid dispensing device comprising an open-mouthed generally cylindrical measuring receptacle, means for mounting said receptacle on the mouth of a liquid container at an angle thereto such that the receptacle is upright when the container is tilted for pouring but opens at an incline downward with the container in standing position, said receptacle having an opening in its side wall adjacent to said container mouth, to communicate between said container and said receptacle for pouring a measure of liquid into said receptacle by tilting of said container, and an inwardly projecting lip formed along the rim of said side of the receptacle, to catch drops of liquid tending to drip back out of said receptacle when said container is placed in standing position after pouring, the inner side of said lip extending, at an incline relative to the receptacle wall, to the adjacent edge of said opening to return liquid caught by such lip back through said opening into said container with the same returned to standing position.

3. The liquid dispensing device defined in claim 2 wherein the lip is of maximum inwardly projecting width at a circumferential location on the rim corresponding to the location of the opening, and tapers in width circumferentially of the receptacle, on each side of said location, to merge with the inner wall edge of said rim at the opposite ends of said lip.

4. The liquid dispensing device defined in claim 2 wherein the lip extends along the rim by an angular distance in the vicinity of 180 degrees of circumference of the receptacle, and the lip is of maximum inwardly projecting width at a circumferential location on the rim corresponding to the location of the opening, and tapers in width circumferentially of the receptacle, on each side of said location, to merge with the inner wall edge of said rim at the opposite ends of said lip.

5. A liquid dispensing device comprising an open-mouthed generally cylindrical measuring receptacle, means for mounting said receptacle on the mouth of a liquid container at an angle thereto such that the receptacle is upright when the container is tilted for pouring but opens at an incline downward with the container in standing position, said receptacle having a spout opening in its wall adjacent to said container mouth, extending through said mounting means to communicate between said container and said receptacle for pouring liquid into said receptacle by tilting of said container, and a breather-tube bore located in said mounting means adjacent to said spout opening, and extending generally parallel to the axis of the container a breather tube received slideably but held frictionally in said breather tube bore to extend from within said liquid container to within said receptacle, the location of the entrance of said tube in said receptacle above the bottom thereof being adjustable by longitudinal sliding adjustment of said tube to vary the displacement air cut-off level of liquid poured into said receptacle from said container and covering said entrance, and means on said receptacle wall, above said openings therein, operable to catch drops of liquid tending to drip back out of said receptacle when said container is placed in standing position.

6. A liquid dispensing device comprising an open-mouthed generally cylindrical measuring receptacle, means for mounting said receptacle on the mouth of a liquid container at an angle thereto such that the receptacle is upright when the container is tilted for pouring, said receptacle having a spout opening in its wall adjacent to said container mouth, extending through said mounting means to communicate between said container and said receptacle for pouring liquid into said receptacle by tilting of said container, and a breather-tube bore located in said mounting means adjacent to said spout opening and extending generally parallel to the axis of the container, a breather tube received slideably but held frictionally in said breather tube bore to extend from within said liquid container to within said receptacle, the location of the entrance of said tube in said receptacle above the bottom thereof being adjustable by longitudinal sliding adjustment of said tube to vary the displacement air cut-off level of liquid poured into said receptacle from said container and covering said entrance.

WILLIAM L. HAID.

REFERENCES CITED

The following references are of record in the file of this patent:

UNITED STATES PATENTS

| Number | Name | Date |
| --- | --- | --- |
| 1,227,658 | Prenosil | May 29, 1917 |
| 1,642,425 | Miller | Sept. 13, 1927 |
| 1,986,811 | Hanna | Jan. 8, 1935 |
| 2,116,979 | Moller | May 10, 1938 |

FOREIGN PATENTS

| Number | Country | Date |
| --- | --- | --- |
| 7,019 | Great Britain | Mar. 26, 1903 |
| 210,450 | Great Britain | Mar. 26, 1925 |